United States Patent
Lim et al.

(10) Patent No.: US 8,204,120 B2
(45) Date of Patent: Jun. 19, 2012

(54) METHOD FOR INTRA PREDICTION CODING OF IMAGE DATA

(75) Inventors: Yong-Hyun Lim, Seoul (KR); Young-Hun Joo, Yongin-si (KR)

(73) Assignee: Samsung Electronics Co., Ltd., Maetan-dong, Yeongtong-gu, Suwon-si, Gyeonggi-do (KR)

(*) Notice: Subject to any disclaimer, the term of this patent is extended or adjusted under 35 U.S.C. 154(b) by 674 days.

(21) Appl. No.: 12/370,680

(22) Filed: Feb. 13, 2009

(65) Prior Publication Data

US 2009/0201991 A1    Aug. 13, 2009

(30) Foreign Application Priority Data

Feb. 13, 2008   (KR) .................. 10-2008-0013215

(51) Int. Cl.
*H04N 11/02* (2006.01)
*H04N 11/04* (2006.01)

(52) U.S. Cl. .................. 375/240.13; 375/240.24
(58) Field of Classification Search .......... None
See application file for complete search history.

(56) References Cited

U.S. PATENT DOCUMENTS

| | | | |
|---|---|---|---|
| 6,137,922 A | 10/2000 | Broussard et al. | 382/298 |
| 2005/0013497 A1* | 1/2005 | Hsu et al. | 382/239 |
| 2006/0051068 A1* | 3/2006 | Gomila | 386/114 |

FOREIGN PATENT DOCUMENTS

KR   10-0648507   11/2006

OTHER PUBLICATIONS

Matsuo, Shohei, et al.; "Extension of Intra Prediction Using Multiple Reference Lines;" ITU—Telecommunications Standardization Sector; Video Coding Experts Group (VCEG), Document: VCEG-AF05, $32^{nd}$ Meeting, San Jose, CA; Apr. 20-21, 2007.
Wang, Yao, et al.; "Error Control and Concealment for Video Communication: A Review;" Proceedings of the IEEE, vol. 86, No. 5; May 1, 1998; New York; XP011044024.
Mavlankar, Aditya, et al.; "Intraframe Prediction with Intraframe Update Step for Motion-Compensated Lifted Wavelet Video Coding;" Picture Coding Symposium; Apr. 24-26, 2006; XP030080339.
Shun, Shijun; "Intra-Prediction-Mode Ordering and Coding;" Joint Video Team (JVT) of ISO/IEC MPEG & ITU-T VCEG; Document: JVT-D027; $4^{th}$ Meeting, Klagenfurt, Austria; Jul. 22-26, 2002; XP03005301.
Zhang, Jian, et al.; "A Cell-Loss Concealment Technique for MPEG-2 Coded Video;" IEEE Transactions on Circuits & Systems for Video Technology, vol. 10, No. 4; Jun. 1, 2000; XP011014072.

* cited by examiner

*Primary Examiner* — Clemence Han
(74) *Attorney, Agent, or Firm* — Cha & Reiter, LLC

(57) ABSTRACT

A method of performing an intra prediction coding with respect to a plurality of blocks included in an image frame is provided. The method of performing an intra prediction coding includes confirming whether a neighboring pixel that is referred to in an intra prediction of a block exists in the current frame, if the neighboring pixel referred to in the intra prediction exists, reading the color difference signal value of the pixel referred to in the intra prediction from the current image frame, if at least one neighboring pixel referred to in the intra prediction does not exist, reading the color difference signal value of at least one pixel from the previous image frame and performing the intra prediction with reference to the read color difference signal value of the pixel.

10 Claims, 9 Drawing Sheets

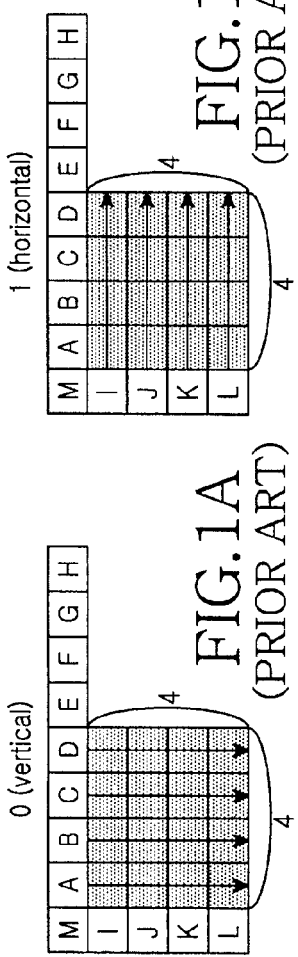
FIG. 1A (PRIOR ART)
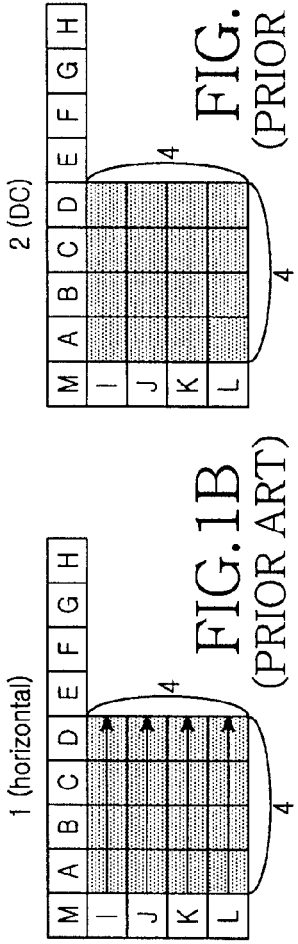
FIG. 1B (PRIOR ART)
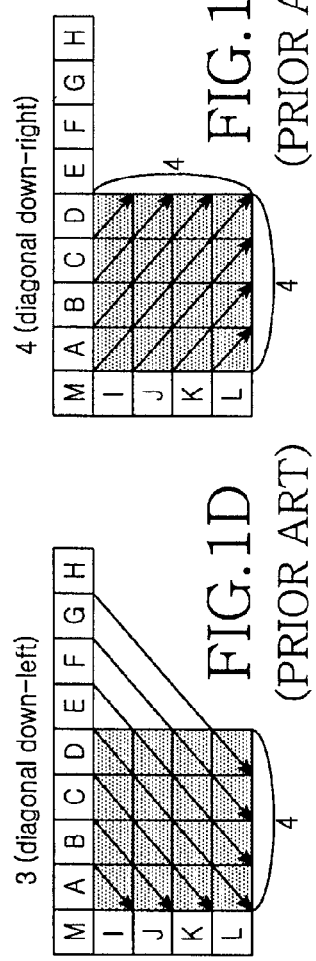
FIG. 1C (PRIOR ART)
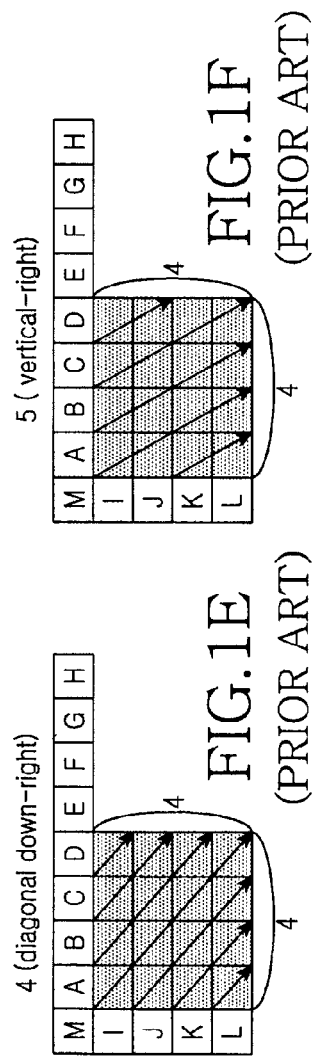
FIG. 1D (PRIOR ART)
FIG. 1E (PRIOR ART)
FIG. 1F (PRIOR ART)
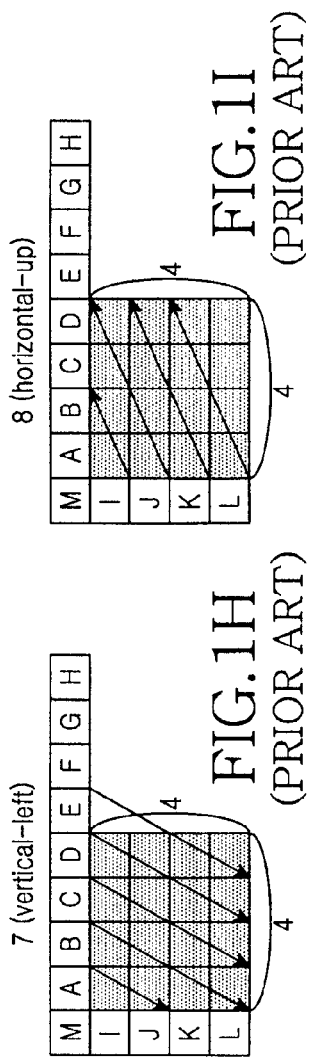
FIG. 1G (PRIOR ART)
FIG. 1H (PRIOR ART)
FIG. 1I (PRIOR ART)

CURRENT FRAME

PREVIOUS FRAME

FIG.8

METHOD FOR INTRA PREDICTION CODING OF IMAGE DATA

CLAIM OF PRIORITY

This application claims the benefit of the earlier filing date, under 35 U.S.C. §119(a), to that patent application entitled "Method And Apparatus For Session Negotiation In A Mobile Communication System, And Mobile Communication System For The Same" filed in the Korean Intellectual Property Office on Feb. 13, 2008 and assigned Serial No. 10-2008-0013215, the contents of which are hereby incorporated by reference.

BACKGROUND OF THE INVENTION

1. Field of the Invention

The present invention relates to image encoding, and more particularly to a method for intra prediction coding of image data that can improve the compression ratio of image data.

2. Description of the Related Art

In general, in the case of intra-coding macro blocks in the H.264/AVC (Advanced Video Coding), which is one of the image compression standards, coding is performed through spatial prediction using neighboring pixel values already coded. Intra modes include intra 4×4 modes and intra 16×16 modes. In accordance with the prediction direction, the intra 4×4 modes include nine modes as illustrated by FIGS. 1A-1I, and the intra 16×16 modes include four modes as illustrated by FIGS. 2A-2D.

In general, according to the intra prediction coding method, a current macro block is coded in 13 modes including the intra 4×4 modes and the intra 16×16 modes, and then the intra coding is performed in the mode having the lowest cost. More specifically, four intra 16×16 prediction modes are performed with respect to the current macro block, and the mode having the lowest cost is selected. Then, nine intra 4×4 prediction modes are performed in order with respect to 16 sub-blocks in the unit of a 4×4 sub-blocks, and then the mode having the lowest cost is selected for each sub-block. Finally, by comparing the costs of the intra 4×4 prediction modes obtained by adding the costs of the intra 16×16 prediction modes to the costs of the 16 sub-blocks, the mode having the lowest cost is finally selected.

However, in the neighborhood of the blocks positioned on a boundary region of the current frame, no pixel exists in the upper region as indicated by block a in FIG. 3, no pixel exist in the left region as indicated by block b, and no block exists in the upper and left regions as indicated by block c. Accordingly, with respect to the blocks positioned on the boundary regions of the current frame, no coding can be performed in some of the 13 modes as described above, and thus the performance of the compression of the blocks positioned on the boundary region of the current frame deteriorates.

SUMMARY OF THE INVENTION

Accordingly, the present invention has been made to solve the above-mentioned problems occurring in the prior art, and the present invention provides an intra prediction coding method which can apply intra prediction modes to all pixel blocks that are not included in the current image frame.

In accordance with an aspect of the present invention, there is provided a method of performing intra prediction coding with respect to multiple blocks included in an image frame, which includes confirming whether the neighboring pixel of a block that is being referred to in the intra prediction exists in the current frame, if the neighboring pixel that the intra prediction refers to exists, reading the color difference signal value of the pixel referred to in the intra prediction from the current image frame, if at least one neighboring pixel being referred to in the intra prediction does not exist, reading the color difference signal value of at least one pixel from the previous image frame and performing the intra prediction with reference to the color difference signal value of the pixel which were read.

BRIEF DESCRIPTION OF THE DRAWINGS

The above and other aspects, features and advantages of the present invention will be more apparent from the following detailed description taken in conjunction with the accompanying drawings, in which:

FIG. 1 is a view illustrating intra 4×4 modes for intra prediction coding based on the H.264 standard;

FIG. 5 is an exemplary view illustrating blocks predicted by an intra prediction coding method according to an embodiment of the present invention and moving image frames including pixels referred to in the intra prediction;

FIG. 6 is another exemplary view illustrating blocks predicted by an intra prediction coding method according to an embodiment of the present invention and moving image frames including pixels referred to in the intra prediction;

FIG. 7 is still another exemplary view illustrating blocks predicted by an intra prediction coding method according to an embodiment of the present invention and moving image frames including pixels referred to in the intra prediction;

FIG. 8 is still another exemplary view illustrating blocks predicted by an intra prediction coding method according to an embodiment of the present invention and moving image frames including pixels referred to in the intra prediction.

DETAILED DESCRIPTION OF THE INVENTION

Exemplary embodiments of the present invention will be described with reference to the accompanying drawings. In the following description, various specific definitions are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

In an embodiment of the present invention, it is exemplified that an intra prediction coding method according to the present invention is applied to the H.264/AVC standard. Accordingly, the coding unit may be a macro block that is a unit for coding pixels included in an image frame in the H.264/AVC standard.

Also, in an embodiment of the present invention, a sub-unit (e.g. sub-block), which is obtained by dividing a coding unit (e.g. macro block) into multiple portions, is defined as a unit for coding intra-prediction modes. Further, in an embodiment of the present invention adopting the H.264/AVC standard, the sub-unit may be composed of a 4×4 matrix of pixels.

Although it is exemplified that the intra-prediction coding according to the present invention is applied to the H.264/AVC standard, the present invention is not limited to the H.264/AVC standard only, but can be applied to other moving image coding methods using the intra-prediction coding in diverse forms. In addition, although it is exemplified that the coding unit is a macro block, and the sub-unit is composed of 4×4 pixels in the described embodiment of the present invention, the present invention is not limited thereto, but can be applied to moving image coding methods in diverse manners.

Further, in an embodiment of the present invention, the frame which the coding is being performed on is defined as the current frame (CF), and the frame which the coding has already been performed on and which neighbors the current frame in time and angle is defined as the previous frame (PF).

Figure 2A:
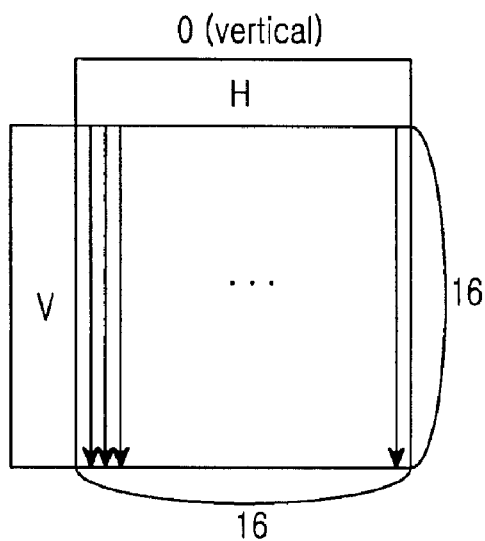
FIG. 2 is a view illustrating intra 16×16 modes for intra prediction coding based on the H.264 standard.
Figure 2B:
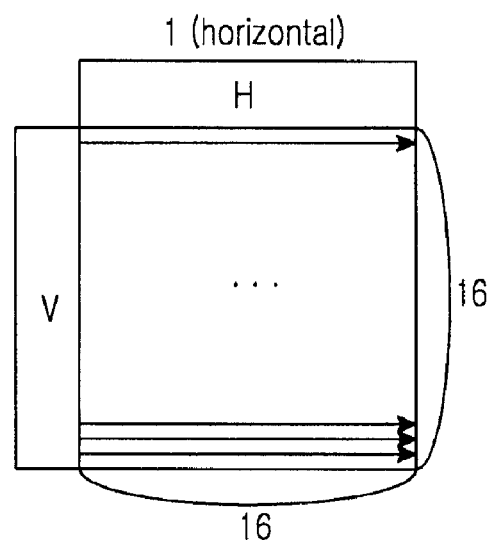
Figure 2C:
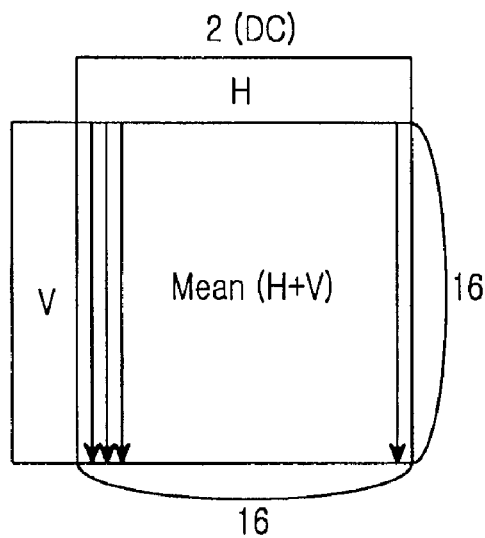
Figure 2D:
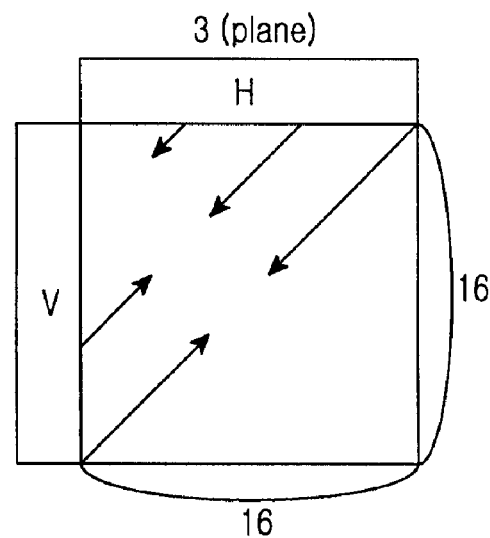
Figure 3:
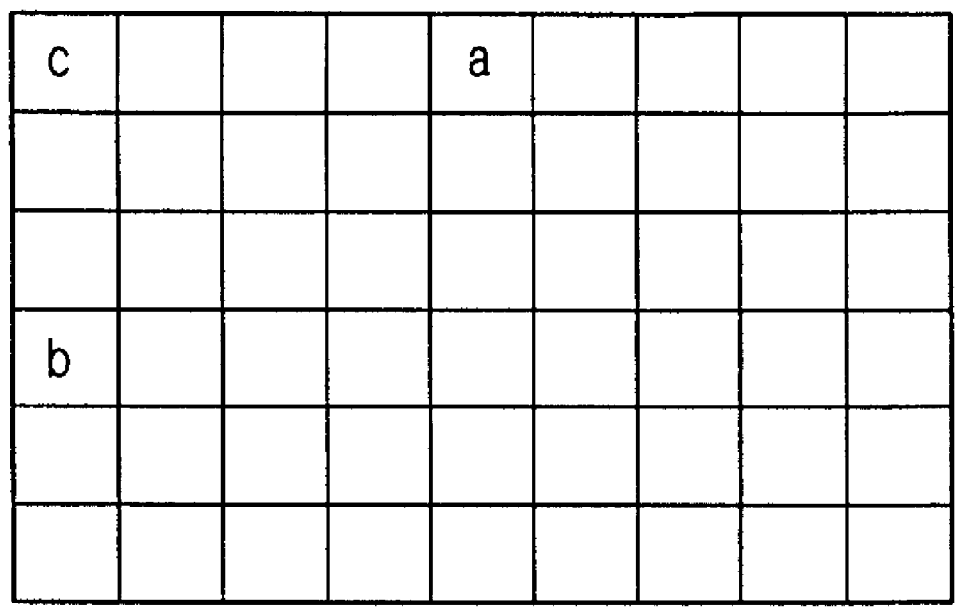
FIG. 3 is an exemplary view of an image frame including multiple blocks to be intra-prediction-coded.
Figure 4:
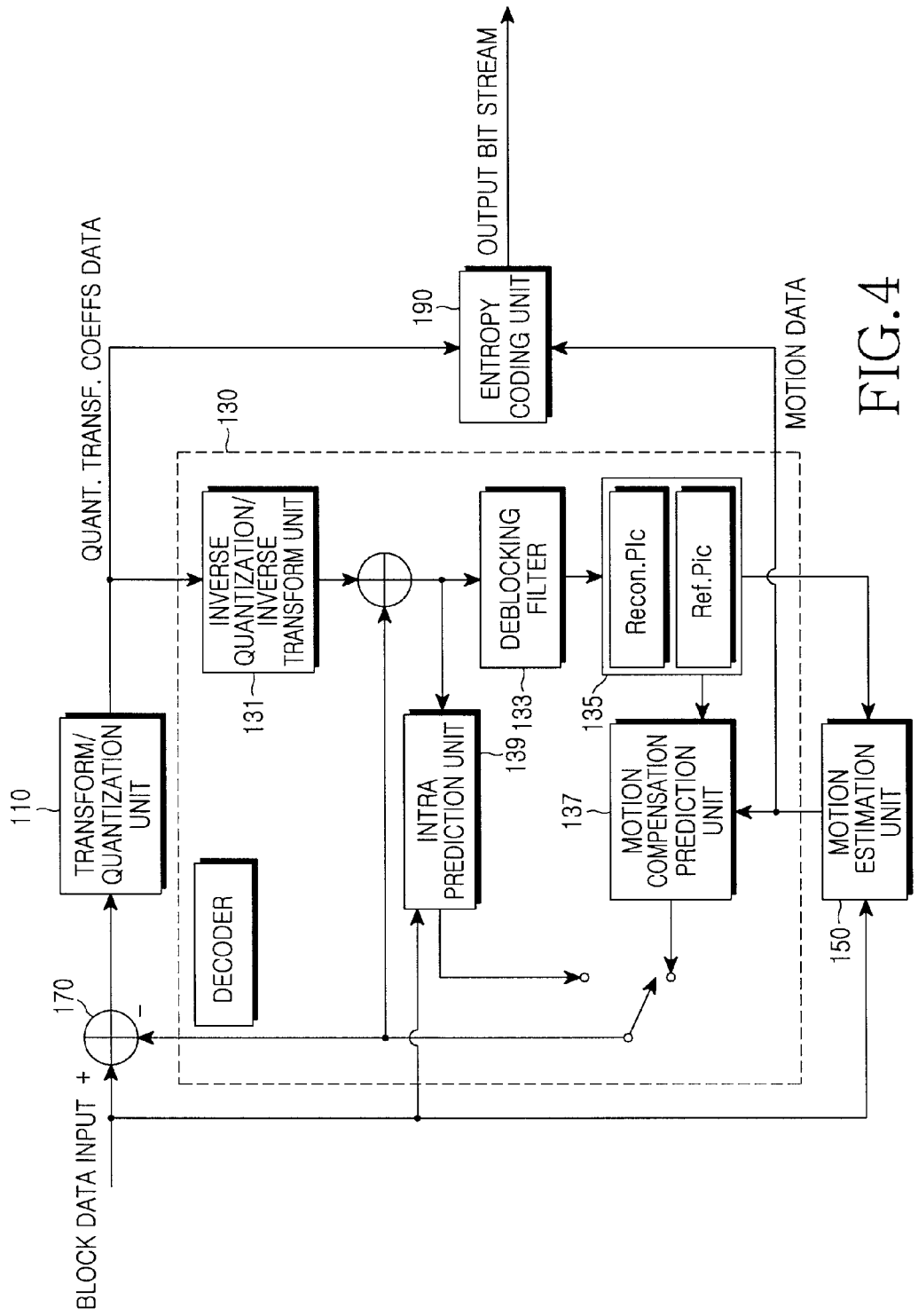
FIG. 4 is a block diagram illustrating the configuration of a moving image coding apparatus according to an embodiment of the present invention.

FIG. 4 is a block diagram illustrating the configuration of a moving image coding apparatus according to an embodiment of the present invention.

Referring to FIG. 4, the moving image coding apparatus according to an embodiment of the present invention includes a transform/quantization unit 110, an inverse quantization/inverse transform unit 131, a de-blocking filter unit 133, a picture restoring unit 135, a motion compensation prediction unit 137, an inter-prediction unit 139, a motion estimation unit 150, a subtraction unit 170, and an entropy coding unit 190.

The transform/quantization unit 110 receives an input of image data in the unit of a macro block. The transform/quantization unit 110 transforms and quantizes the input macro block in a specified method. A representative image transform technique is discrete cosine transform (DCT).

The inverse quantization/inverse transform unit 131 receives the transformed and quantized image data from the transform/quantization unit 110, and performs inverse quantization and inverse transform of the received image data. The de-blocking filter unit 133 receives the inverse-quantized and inverse-transformed image data from the inverse quantization/inverse transform unit 131, and performs the filtering for removing the blocking effect.

The picture restoring unit 135 receives the filtered image data from the de-blocking filter unit 133, restores and stores the received image in the unit of a picture. A picture is an image in the unit of a frame or in the unit of a field. The picture restoring unit 135 is provided with a buffer (not illustrated) that can store multiple pictures. The plurality of pictures stored in the buffer is reference pictures provided for motion estimation.

The motion estimation unit 150 receives at least one reference picture stored in the picture restoring unit 135, performs a motion estimation of the input macro block, and outputs motion data that includes an index indicating the reference picture and a block mode.

The motion compensation prediction unit 137 extracts a macro block corresponding to the input macro block from the reference picture that has been used for the motion estimation of the multiple reference pictures stored in the picture restoring unit 135, in accordance with the motion data input from the motion estimation unit 150, and outputs the extracted macro block.

The subtraction unit 170, in the case of performing an inter-picture prediction encoding of the input macro block, receives the macro block in the reference picture corresponding to the input macro block from the motion compensation prediction unit 137, performs a differential operation between the input macro block and the macro block in the reference picture, and outputs a residue signal.

The residue signal output from the subtraction unit 170 is transformed and quantized by the transform/quantization unit 110, and is entropy-coded by the entropy coding unit 190, so that an output bit stream is generated.

The intra prediction unit 139 performs an inter prediction coding using a reconstructed adjacent pixel value in the picture of which the prediction is performed. The reconstructed adjacent pixel value is a value generated by combining the predicted block and the residue signal having passed through the transform, quantization, inverse quantization and inverse transform processes.

The operation of the intra prediction unit 139 according to the preferred embodiment of the present invention will be described in detail.

The intra prediction unit 139 successively performs the intra prediction with respect to the 4×4 pixel block included in the current frame. In particular, the intra prediction unit 139 performs the intra prediction in consideration of a position where the 4×4 block, on which the intra prediction is being performed. For this, the intra prediction unit 139 preferentially confirms whether the 4×4 block on which the intra prediction is being performed is positioned in the upper edge or the left edge of the current frame. Then, the intra prediction unit 139 reads the adjacent pixels required to generate the predicted block in nine prediction modes in consideration of the confirmed position.

Figure 5:
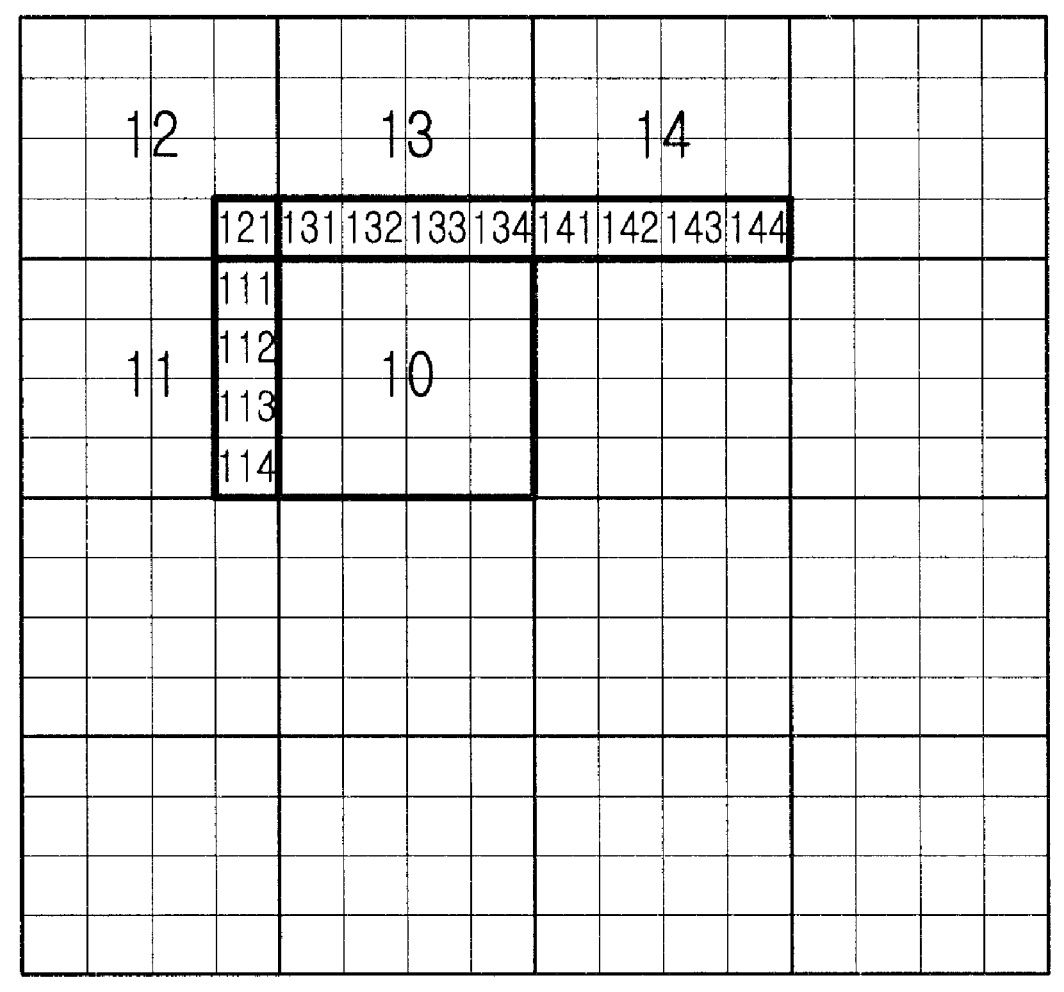

Specifically, the intra prediction unit 139 generates predicted blocks with respect to the blocks except for the left or upper edge region of the frame in accordance with the respective nine prediction modes using the adjacent pixels included in the four adjacent 4×4 blocks. For example, as illustrated in FIG. 5, the intra prediction unit 139 reads the adjacent pixels 111, 112, 113, 114, 121, 131, 132, 133, 134, 141, 142, 143, and 144, which are included in the blocks 11, 12, 13, and 14, respectively, that are adjacent to the specified 4×4 block 10 and generates a predicted block in accordance with the nine prediction modes. The intra prediction unit 139 then calculates a differential block according to the prediction modes by obtaining a difference between the predicted block and the original block that is the subject of prediction. Thereafter, the intra prediction unit 139 calculates costs from the differential blocks according to the prediction modes, and determines the prediction mode of the differential block having the minimum cost from the costs calculated according to the prediction modes. Here, the cost is a function value indicating the accuracy of the prediction coding and the generated bit amount. Examples of such a function for measuring the costs may be the sum of absolute differences (SAD), the sum of absolute transformed differences (SATD), the sum of squared differences (SSD), the mean of absolute differences (MAD), and the like. For example, the cost using the SAD function among the functions for the cost measurement is a value obtained by adding all the absolute values of differences between the predicted values of the respective pixels of the current 4×4 block (or macro block) and the actual pixel values.

Figure 6:
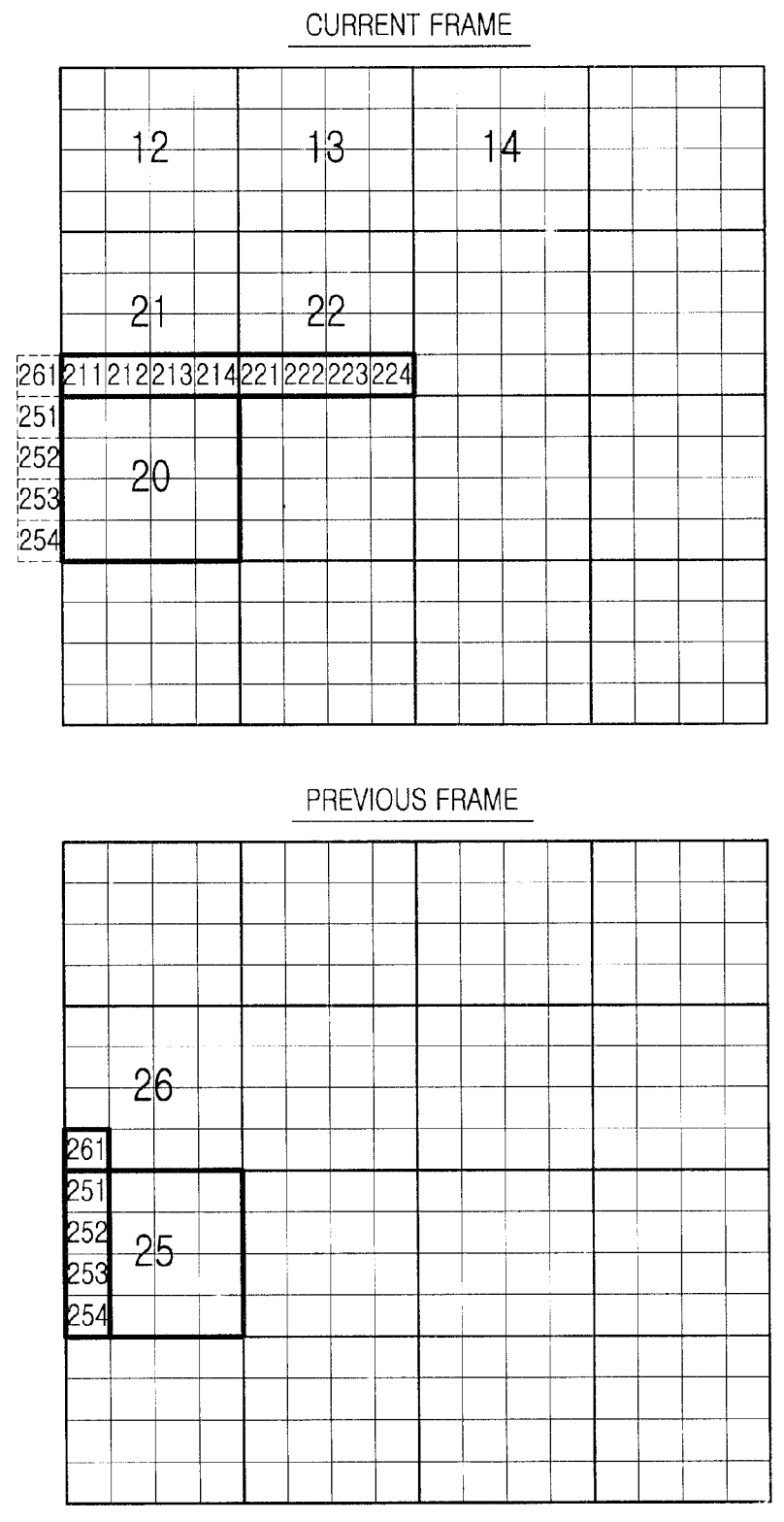

By contrast, as a substitute for the above-described method of performing the intra prediction with respect to the blocks positioned in the left or upper edge region of the frame using the adjacent pixels included in four adjacent 4×4 blocks of the current frame, the intra prediction unit 139 generates predicted blocks in accordance with the nine prediction modes using the pixels included in the 4×4 block of the previous frame corresponding to the position of the 4×4 block of the current frame and the pixels included in the blocks neighboring the 4×4 block. For example, as illustrated in FIG. 6, in the case where the intra prediction unit 139 performs the intra prediction with respect to 4×4 block 20 positioned in the left edge of the current frame, it reads the pixels 211, 212, 123, 214, 221, 222, 223, and 224 included in the 4×4 blocks 21 and 22 adjacent to the specified 4×4 block 20 of the current frame. The pixels 251, 252, 253, and 254 included in the 4×4 block 25 of the previous frame corresponding to the position of the specified 4×4 block 20 of the current frame, and the pixel 261 included in the 4×4 block 26 neighboring the 4×4 block 25 of the previous frame, and generates a predicted block in accordance with the nine prediction modes.

Figure 7:
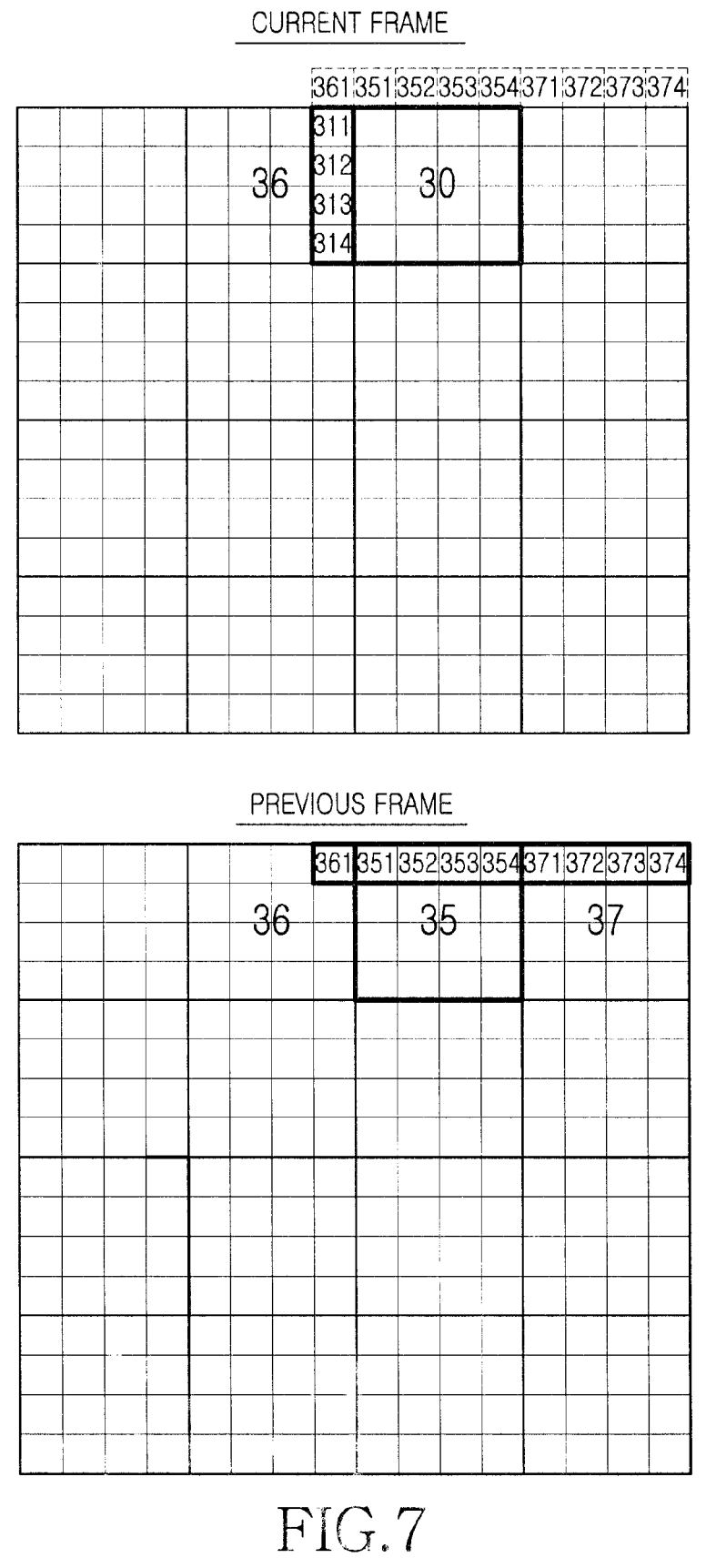

Similarly, as illustrated in FIG. 7, in the case where the intra prediction unit 139 performs the intra prediction with respect to a specified 4×4 block 30 positioned at the upper edge of the current frame, it reads the pixels 311, 312, 313, and 314 included in the 4×4 block 31 adjacent to the specified 4×4 block 30 of the current frame, the pixels 351, 352, 353, and 354 included in the 4×4 block 35 of the previous frame corresponding to the position of the specified 4×4 block 30 of the current frame, and the pixels 361, 371, 372, 373, and 374 included in the 4×4 blocks 36 and 37 neighboring the 4×4 block 35 of the previous frame, and generates a predicted block in accordance with the nine prediction modes.

Figure 8:
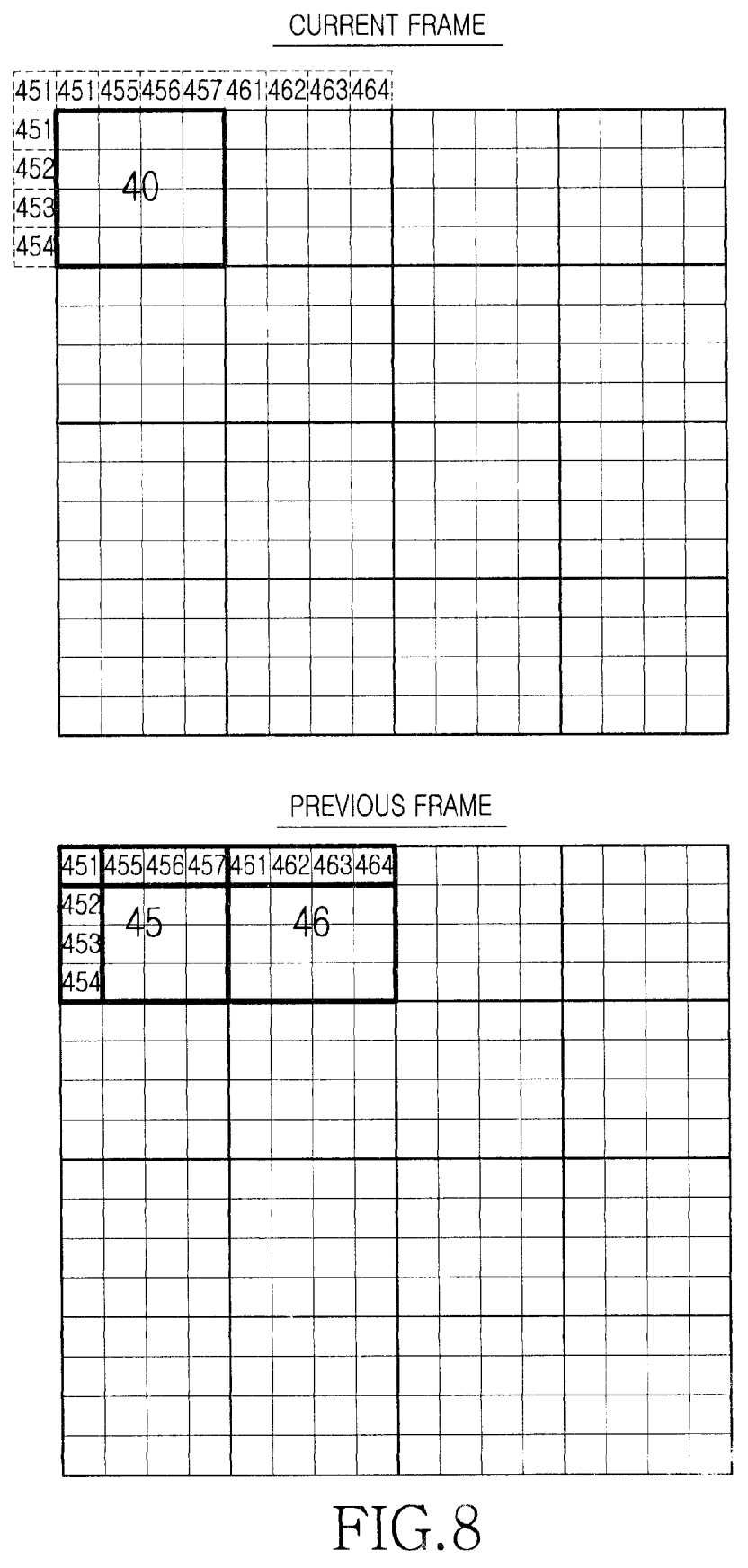

Also, as illustrated in FIG. 8, if the intra prediction unit 139 performs the intra prediction with respect to a 4×4 block 40 positioned in the upper and left edges of the current frame, the current frame does not include pixels required for the intra prediction. Accordingly, the intra prediction unit 139 reads the pixels 451, 452, 453, 454, 455, 456, and 457 included in the 4×4 block 45 of the previous frame corresponding to the position of the specified 4×4 block 40 of the current frame, and the pixels 461, 462, 463, and 464 included in the 4×4 block 46 neighboring the specified 4×4 block 45, and generates a predicted block in accordance with the nine prediction modes.

Figure 9:
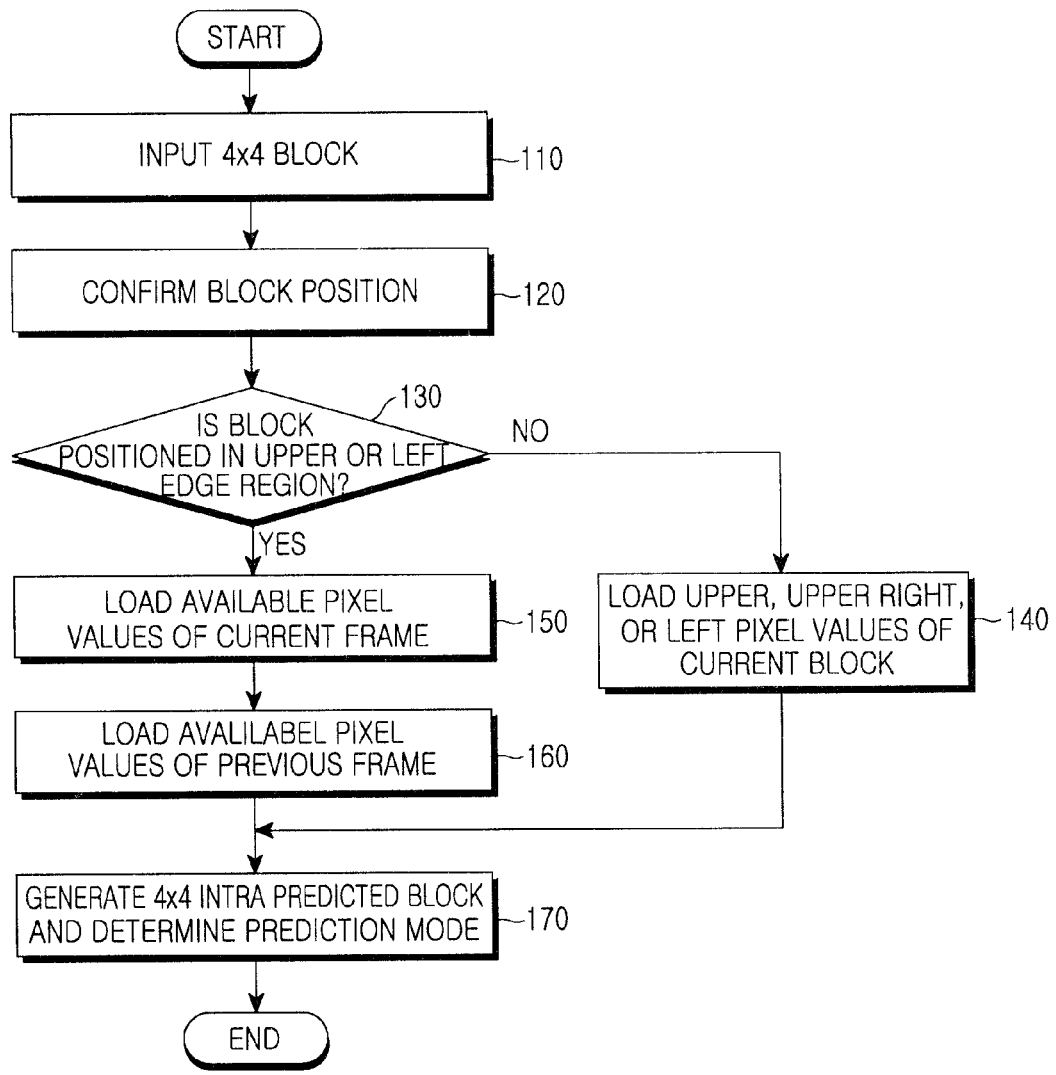
FIG. 9 is a flowchart illustrating a method for intra prediction coding according to an embodiment of the present invention.

FIG. 9 is a flowchart illustrating a method for intra prediction coding according to an embodiment of the present invention.

With reference to FIG. 9, the method for intra prediction coding according to an embodiment of the present invention will be described.

First, in step 110, a 4×4 block for performing the intra prediction is input. Then, in step 120, the position where the 4×4 block is distributed in the frame is confirmed. In step 130, it is determined whether the 4×4 block is positioned in the upper or left edge region of the frame using the result of confirmation in step 120.

If the 4×4 block is not positioned in the upper or left edge region of the frame, step 140 is performed. In step 140, adjacent pixels included in four 4×4 blocks neighboring the 4×4 block are read. For example, if the 4×4 block is the specified 4×4 block 10 as illustrated in FIG. 5, the pixels 111, 112, 113, 114, 121, 131, 132, 133, 134, 141, 142, 143, and 144, which are included in the blocks 11, 12, 13, and 14, respectively, adjacent to the specified 4×4 block 10, are read.

By contrast, if the 4×4 block is positioned in the upper or left edge region of the frame, steps 150 and 160 are performed. In step 150, the available pixels among pixels required in the intra prediction mode of the 4×4 block of the current frame are read, and in step 160, the pixels, which cannot be read from the current frame, are read from the previous frame. For example, if the 4×4 block is the specified 4×4 block 20 as illustrated in FIG. 6, the pixels 211, 212, 213, 214, 221, 222, 223, and 224 included in the 4×4 blocks 21 and 22 adjacent to the specified 4×4 block 10 of the current frame are read. In step 160, the pixels 251, 252, 253, and 254 included in the 4×4 block 25 of the previous frame, which correspond to the position of the specified 4×4 block 20 of the current frame, and the pixel 261 included in the 4×4 block 26 neighboring the 4×4 block 25 of the previous frame are read.

Then, in step 170, a predicted block is generated in accordance with the nine prediction modes using the pixel values read through the steps 140, 150, and 160, and the prediction mode is determined. That is, a differential block is calculated according to the prediction modes by obtaining a difference between the predicted block generated based on the nine prediction modes and the original block that is the subject of the prediction. Thereafter, costs are calculated from the differential blocks according to the prediction modes, and the prediction mode of the differential block having the minimum cost is determined from the costs calculated according to the prediction modes.

According to the intra prediction coding method according to the present invention, the predicted block can be generated based on the prediction modes even with respect to the blocks positioned in the upper or left edge region of the frame. Accordingly, the intra prediction method according to the present invention can keep a relatively stable and excellent compression performance in comparison to the existing compression method that has a limited compression performance with respect to the blocks positioned in the boundary region of the frame. Also, by reducing the residue at minimum using the characteristics that an image has high spatial and temporal correlation, the compression ratio can be heightened.

The intra prediction coding method according to the present invention can be implemented as a computer readable code in a computer readable recording medium. The computer readable recording medium includes all kinds of recording devices where data that can be read by a computer system is stored. Examples of computer readable recording medium include ROM, RAM, CD-ROM, magnetic tape, floppy disk, optical disk, and the like, and also include those implemented in the form of a carrier wave (e.g. transmission through internet). Also, the computer readable recording medium may be distributed in a computer system connected through a network, and the intra prediction coding method according to the present invention may be stored and executed as a code that can be read by a computer in a distribution method. The methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of performing intra prediction coding with respect to a plurality of blocks included in an image frame, comprising:

confirming whether a neighboring pixel that is referred to in an intra prediction of a block exists in a current image frame;

if the neighboring pixel referred to in the intra prediction exists, reading a color difference signal value of the neighboring pixel referred to in the intra prediction from the current image frame;

if the neighboring pixel referred to in the intra prediction does not exist, reading a color difference signal value of at least one pixel from a previous image frame that corresponds to the block of the current image frame; and performing the intra prediction with reference to the read color difference signal value of the neighboring pixel and the read color difference signal value of the at least one pixel.

2. The method of claim 1, wherein the step of reading the color difference signal value of at least one pixel from a previous image frame comprises:

reading the color difference signal value of the at least one pixel positioned at the uppermost edge of the previous image frame, if the neighboring pixel referred to in the intra prediction does not exist in an upper region of the block.

3. The method of claim 1, wherein the step of reading the color difference signal value of at least one pixel from a previous image frame comprises:

reading the color difference signal value of the at least one pixel positioned at the leftmost edge of the previous image frame, if the neighboring pixel referred to in the intra prediction does not exist in a left region of the block.

4. The method of claim 1, wherein the step of performing the intra prediction comprises performing an estimation of at least one intra prediction mode of the block with reference to the color difference signal value of the neighboring pixel included in the current image frame and/or the color difference signal of the at least one pixel included in the previous image frame.

5. An image coding apparatus comprising:
an intra prediction unit for performing intra coding;
wherein if a current image frame does not include at least one pixel value referred to in an intra prediction, the intra prediction unit reads the at least one pixel value referred to in the intra prediction from a previous frame.

6. A device including a processor programmed for performing intra prediction coding of a current image frame according to a method comprising steps of:

determining a position of an image block within said current image frame, performing said intra prediction coding using neighboring pixels of said image block when said position of said image block satisfy a first set of criteria; and performing said intra prediction coding using said neighboring pixels and selected pixels from a previous image frame that corresponds to the said image of said current image frame.

7. The device of claim 6, wherein said first set of criteria comprising at least one of: not on a left edge of said current image frame and not on an upper edge of said current image frame.

8. The device of claim 6, wherein said selected pixels from said previous image frame correspond to pixels along a left edge of said current image frame.

9. The device of claim 6, wherein said selected pixels from said previous image frame correspond to pixels along an upper edge of said current image frame.

10. The device of claim 6, wherein said image block is selected from the group of blocks having size of: 4×4 and 16×16.

* * * * *